Jan. 9, 1945.　　　　G. W. WILLARD　　　　2,366,822
ULTRASONIC CELL
Filed Dec. 2, 1942
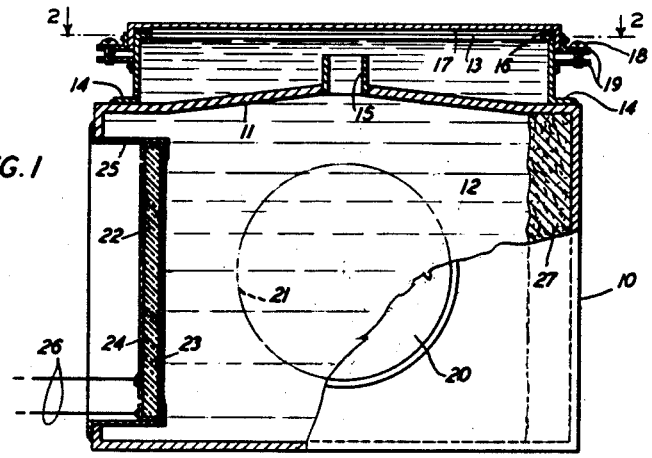
INVENTOR
G. W. WILLARD
BY
*G. F. Heuerman*
ATTORNEY Patented Jan. 9, 1945

2,366,822

UNITED STATES PATENT OFFICE 2,366,822

ULTRASONIC CELL

Gerald W. Willard, Fanwood, N. J., assignor to Bell Telephone Laboratories, Incorporated, New York, N. Y., a corporation of New York Application December 2, 1942, Serial No. 467,651

2 Claims. (Cl. 88—61)

This invention relates to a compressional wave device and particularly to an ultrasonic cell employing a liquid wave propagating medium which cell may be used in any desired orientation.

An object of the invention is to provide an improved form of liquid ultrasonic cell in which that portion of the cell through which compressional waves are propagated is kept filled with liquid at substantially constant pressure irrespective of the orientation of the cell and volume changes of the liquid.

The invention is applicable to devices, ultrasonic light valves, for example, employing a liquid medium through which are propagated compressional waves set up therein by a vibrating element such as a piezoelectric crystal. Ultrasonic cells are disclosed, for example, in my Patent No. 2,287,587, granted June 23, 1942, and in my applications Serial No. 467,650, filed December 2, 1942 (Patent No. 2,345,441, granted March 28, 1944), and Serial No. 467,652, filed December 2, 1942.

In accordance with a specific embodiment of the invention shown and described herein for the purpose of illustration, there is provided an ultrasonic cell comprising a reservoir for a liquid, a piezoelectric driver for setting up compressional waves in the liquid, and a means for absorbing the waves which have been propagated through the liquid for preventing their reflection. That portion of the reservoir or cell through which the compressional waves are propagated is maintained filled with liquid at substantially constant pressure irrespective of temperature changes and irrespective of the orientation of the cell.

The liquid reservoir is provided with a partition for dividing it into two compartments. The one compartment is completely filled with liquid through which the compressional waves are radiated. The second compartment is partly filled with liquid and the remainder is filled with air or other gas at a pressure equal to the pressure at which the cell is to be used. A conduit connecting the two compartments is completely submerged in the liquid irrespective of the orientation of the cell so that the air or other gas in the cell does not enter the first compartment. Preferably one end of the conduit terminates at an opening in the partition and the other end is positioned at or near the center of the second compartment.

In the accompanying drawing, Fig. 1 is a view in front elevation partly in section of an ultrasonic cell constructed in accordance with the present invention; and Fig. 2 is a view partly in section taken along the line 2—2 of Fig. 1.

The ultrasonic cell shown in Figs. 1 and 2 comprises a metallic tank or reservoir 10 which is divided into two compartments by a partition 11. The portion of the reservoir below the partition 11, as viewed in Fig. 1, is completely filled with a liquid 12 and the portion of the reservoir above the partition is partly filled with liquid 12, there being an air space 13 above the surface of the liquid. The upper portion of the reservoir is attached to the lower portion by welding the flange 14 to the partition 11. The partition 11 has a small opening therein at its central portion in which is secured a short pipe 15 through which the liquid 12 may flow from a compartment on one side of the partition 11 to the compartment on the other side. The partition 11 is sloped upwardly toward the conduit 15 as viewed in Fig. 1. When the reservoir 10 has been filled with liquid 12 to a desired level the cell is sealed by means of a gasket 16 and cover 17, the cover being secured by means of screws 18 in lugs 19. Lenses 20 and 21 are provided in opposite walls of the cell through which a light beam to be modulated may be directed. The light beam is modulated in response to compressional waves set up in the liquid of the cell by a piezoelectric driver comprising a piezoelectric crystal 22 having inner and outer electrodes 23 and 24, respectively, which may be plated on the crystal surface. An opening in reservoir 10 is provided for receiving the driver 22, 23, 24, the driver being supported by means of a flexible copper foil strip 25 which is soldered along one edge to the plating which forms the electrode 23 and along the other edge to the wall of the tank 10. Electrical energy from a source, not shown, for setting the crystal 22 into vibration is impressed upon the electrodes 23, 24 by way of the leads 26. A pad 27 of suitable material such as animal wool embedded in a gelatinous substance, as disclosed in my application, Serial No. 467,652, filed December 2, 1942, is provided for absorbing the compressional waves set up by the piezoelectric driver after their propagation through the portion of the cell in which light is diffracted due to the compressional waves set up therein.

It is desirable to have the body of liquid between the driver 22, 23, 24 and the wave absorbing pad 27 free from air or gas bubbles and such bubbles in this body of liquid will rise to the surface of the liquid through the pipe 15. In ordinary use air will not pass through the tube 15 into the compartment through which compressional waves are propagated since the tube 15 is completely immersed in the liquid at all times irrespective of the orientation of the supersonic cell. The provision of the air space 13 prevents a change in pressure in the liquid, such as would damage the piezoelectric crystal 23 or its mounting, when the volume of the liquid changes due to a change in temperature, for example. The reservoir is preferably filled with liquid and air at a pressure, and at the middle of the temperature range, at which the device is to be used.

What is claimed is:

1. A compressional wave device comprising a liquid reservoir formed by an enclosing wall the outer surface of which is in contact with the outer medium in which said device is to be used, said reservoir being incompletely filled with liquid, the remainder of the space of said reservoir being filled with gas, a partition within said reservoir for dividing said reservoir into two compartments, a first of said compartments being completely filled with liquid, said partition having therein an opening through which liquid may pass from said first compartment to the other compartment, and vice versa, said opening being beneath the liquid level in said reservoir irrespective of the orientation of said device, vibratory means positioned in and closing an opening provided therefor in said enclosing wall and having its inner surface in contact with the liquid in said first compartment for setting up compressional waves in said liquid, portions of said enclosing wall in contact with the liquid in said first compartment having portions through which a light beam may enter and leave said first compartment, said light beam passing through the region in said liquid through which said compressional waves are propagated.

2. A compressional wave device in accordance with claim 1 in which said light transmitting portions of said enclosing wall are lenses positioned in openings provided therefor in said enclosing wall and having their centers on a straight line intersecting the compressional wave set up in said liquid and extending in a direction substantially perpendicular to the direction of propagation of said compressional wave.

GERALD W. WILLARD.